United States Patent
Lai et al.

(10) Patent No.: US 11,467,724 B2
(45) Date of Patent: Oct. 11, 2022

(54) TOUCH DISPLAY DEVICE

(71) Applicant: AU Optronics Corporation, Hsin-Chu (TW)

(72) Inventors: Chun-Chi Lai, Hsin-Chu (TW); Chia-Hsien Chu, Hsin-Chu (TW); Tsang-Hong Wang, Hsin-Chu (TW); Li-Wei Shih, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 20 days.

(21) Appl. No.: 16/853,303

(22) Filed: Apr. 20, 2020

(65) Prior Publication Data

US 2020/0363927 A1 Nov. 19, 2020

(30) Foreign Application Priority Data

May 15, 2019 (TW) ................................. 108116785

(51) Int. Cl.
*G06F 3/0488* (2022.01)
*G06F 3/041* (2006.01)
*G06F 3/044* (2006.01)

(52) U.S. Cl.
CPC ............ *G06F 3/0488* (2013.01); *G06F 3/044* (2013.01); *G06F 3/0412* (2013.01); *G06F 2203/04104* (2013.01)

(58) Field of Classification Search
CPC ...... G06F 3/0488; G06F 3/0412; G06F 3/044; G06F 3/04166; G06F 3/0418; G06F 2203/04104
See application file for complete search history.

(56) References Cited

U.S. PATENT DOCUMENTS

| | | | | |
|---|---|---|---|---|
| 2011/0241907 A1* | 10/2011 | Cordeiro | ............... | G06F 3/0446 341/20 |
| 2012/0146944 A1* | 6/2012 | Lee | ........................ | G06F 3/0446 345/174 |
| 2013/0021293 A1* | 1/2013 | Nakai | .................... | G06F 3/044 345/174 |
| 2013/0328823 A1 | 12/2013 | Liu et al. | | |
| 2014/0049501 A1* | 2/2014 | Santos | ................... | G06F 3/0446 345/174 |

FOREIGN PATENT DOCUMENTS

| | | | | |
|---|---|---|---|---|
| CN | 102483661 A | 5/2012 | | |
| CN | 102541382 A | 7/2012 | | |
| TW | 201614463 A | 4/2016 | | |
| TW | 201913346 A | * 4/2019 | ............ | G06F 3/044 |
| TW | 201913346 A | 4/2019 | | |

\* cited by examiner

*Primary Examiner* — Alexander Eisen
*Assistant Examiner* — Kebede T Teshome
(74) *Attorney, Agent, or Firm* — WPAT, PC (57) ABSTRACT

A touch display device includes a touch detecting circuit and a processor. The touch detecting circuit is configured to detect a first touch signal and a second touch signal. The processor is configured to record a first time point when the first touch signal is received, and record a second time point when the second touch signal is received. The processor is configured to calculate a time difference between the first time point and the second time point, if the time difference is larger than or equal to a threshold, the processor is configured to adjust the first touch signal and the second touch signal according to a baseline.

14 Claims, 7 Drawing Sheets

Fig. 5

TOUCH DISPLAY DEVICE

CROSS-REFERENCE TO RELATED APPLICATION

This application claims priority to Taiwanese Application Serial Number 108116785, filed on May 15, 2019, which is herein incorporated by reference.

BACKGROUND

Field of Invention

The present invention relates to a touch display device. More particularly, the present invention relates to a touch display device with touch point correction function.

Description of Related Art

The projective capacitive technique is usually utilized in the field of touch display. The projective capacitive technique includes self capacitive technology and mutual capacitive technology. In the self capacitive technology, when the user's finger touches the touch panel, it is equivalent to connecting a finger capacitor in parallel. When the finger touches the touch panel, the capacitance will be increased. However, the distance between conductive materials also can determine the capacitance. Therefore, when the touch display device is impacted or dropped to the ground, the distance between the conductive materials in the touch display device will be deformed. It is caused that the capacitance is changed, and thus the misjudgments of touch point or the abnormal capacitance are happened.

SUMMARY

The invention provides a touch display device. The touch display device includes a touch detecting circuit and a processor. The processor is electrically coupled to the touch detecting circuit. The touch detecting circuit is configured to detect a first touch signal and a second touch signal. The processor is configured to record a first time point when the first touch signal is received, and record a second time point when the second touch signal is received. The processor is configured to calculate a time difference between the first time point and the second time point, if the time difference is larger than or equal to a threshold, the processor is configured to adjust the first touch signal and the second touch signal according to a baseline.

The invention provides a touch display device. The touch display device includes a touch detecting circuit and a processor. The processor is electrically coupled to the touch detecting circuit. The touch detecting circuit is configured to detect a touch signal. The processor is configured to determine whether a capacitance of the touch signal is less than a capacitance threshold, if the capacitance of the touch signal is less than the capacitance threshold, the processor is configured to adjust the touch signal according to a baseline.

The invention provides a touch display device. The touch display device includes a touch detecting circuit and a processor. The processor is electrically coupled to the touch detecting circuit. The processor is configured to receive a first touch signal in a first time point and receive a second touch signal in a second time point via the touch detecting circuit, wherein the second time point is later than the first time point; when the touch detecting circuit detects that the second touch signal is released, the processor is configured to adjust a first capacitance corresponding to the first touch signal and a second capacitance corresponding to the second touch signal according to a baseline, to form a first reference capacitance and a second reference capacitance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference labels are used in the drawings and the description to refer to the same or like parts, components, or operations.

Figure 1:
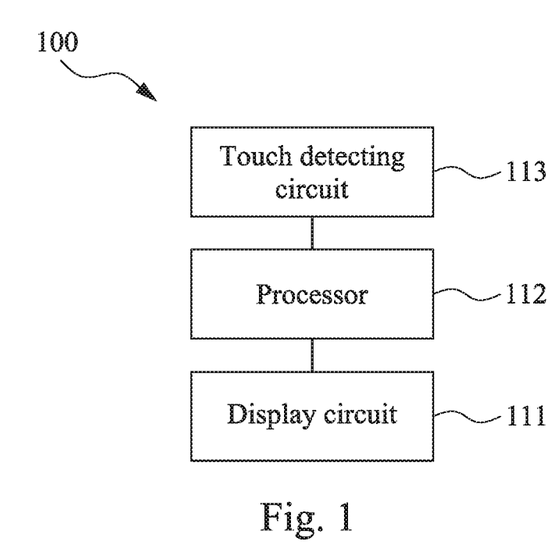
FIG. 1 is a functional block diagram of a touch display device according to one embodiment of the present disclosure.

Reference is made to FIG. 1, which is a functional block diagram of a touch display device 100 according to one embodiment of the present disclosure. As shown in FIG. 1, the touch display device 100 includes a touch detecting circuit 111, a processor 112 and a display circuit 113. The processor 112 is electrically connected to the touch detecting circuit 111 and the display circuit 113. In the embodiment shown in FIG. 1, the touch detecting circuit 111 is configured to detect a first touch signal and a second touch signal. The display circuit 113 is configured to display a displayed screen.

Afterwards, the processor 112 is configured to record a first time point when the first touch signal is received, and record a second time point when the second touch signal is received. The processor 112 is configured to calculate a time difference between the first time point and the second time point, if the time difference is larger than or equal to a threshold, the processor 112 is configured to adjust the first touch signal and the second touch signal according to a baseline.

Figure 2A:
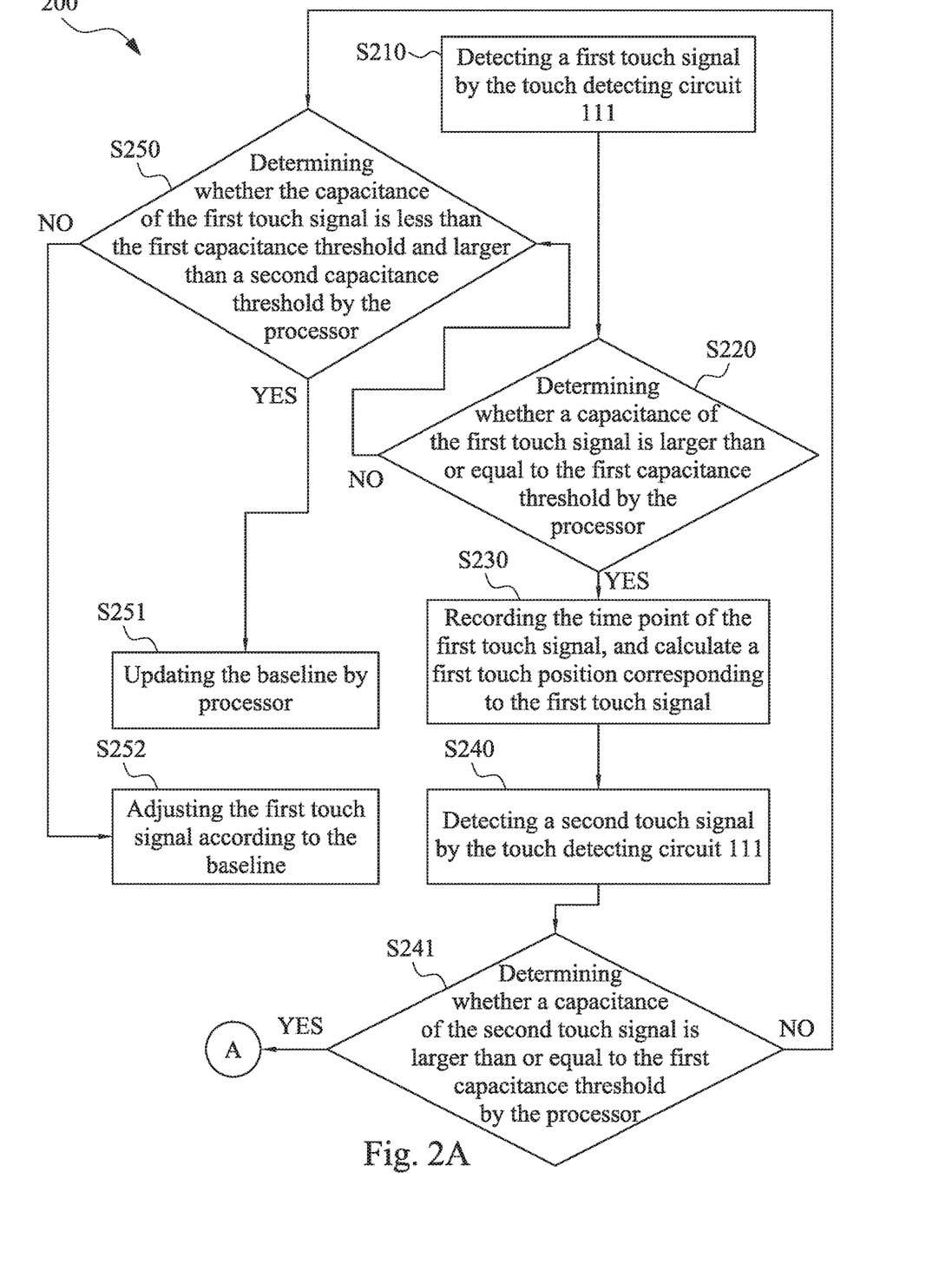
FIG. 2A and FIG. 2B are flow diagrams of a touch correction method for touch display device according to one embodiment of the present disclosure.
Figure 2B:
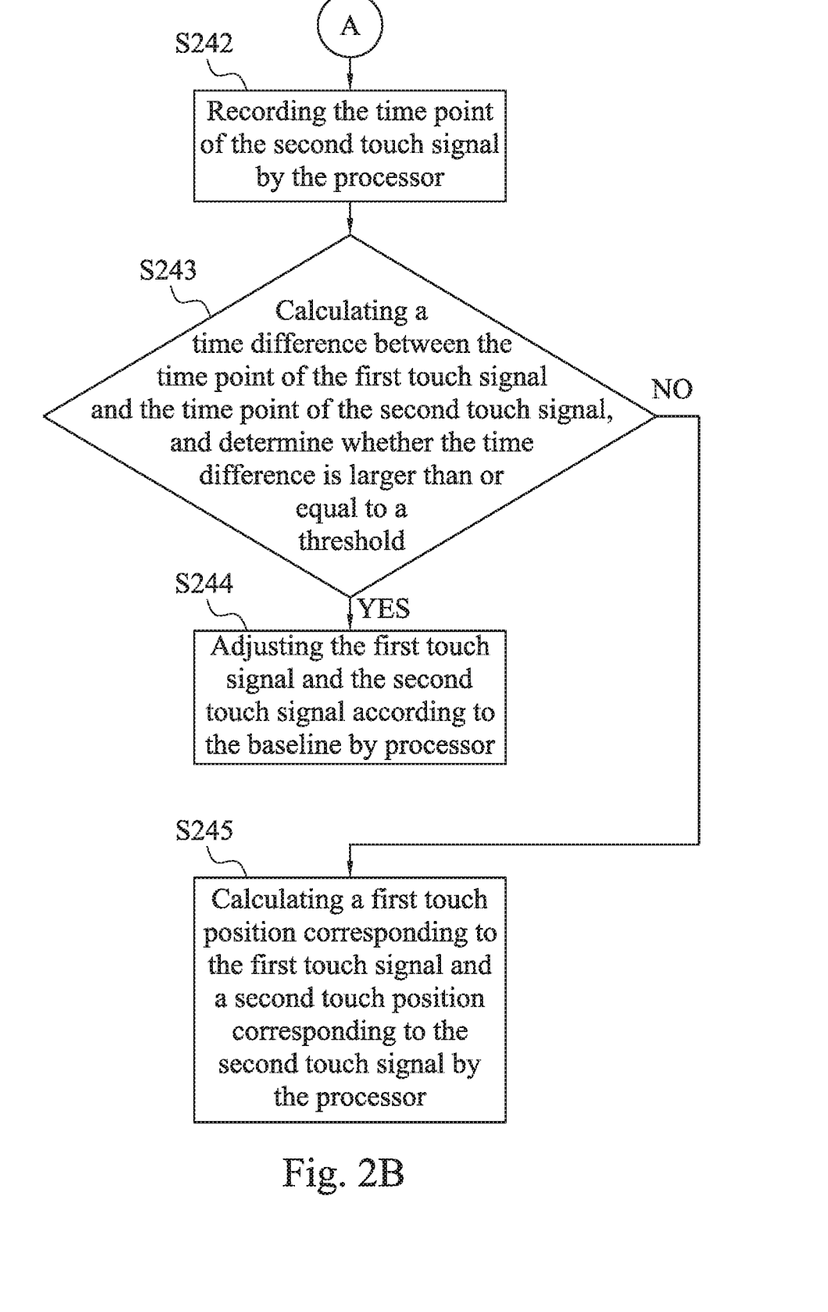

Reference is made to FIG. 1, FIG. 2A and FIG. 2B. FIG. 2A and FIG. 2B are flow diagrams of a touch correction method 200 for touch display device 100 according to one embodiment of the present disclosure. In the embodiment, the processor 110 can be utilized to correct the situation of false touch points or abnormal capacitance caused by impacted or dropped to the ground according to the steps described in the following touch correction method 200. The touch display device 100 can be implemented by a wearable device such as a watch or a bracelet. In another embodiment, the touch display device 100 can be implemented by a mobile device such as a smart phone.

Figure 3A:
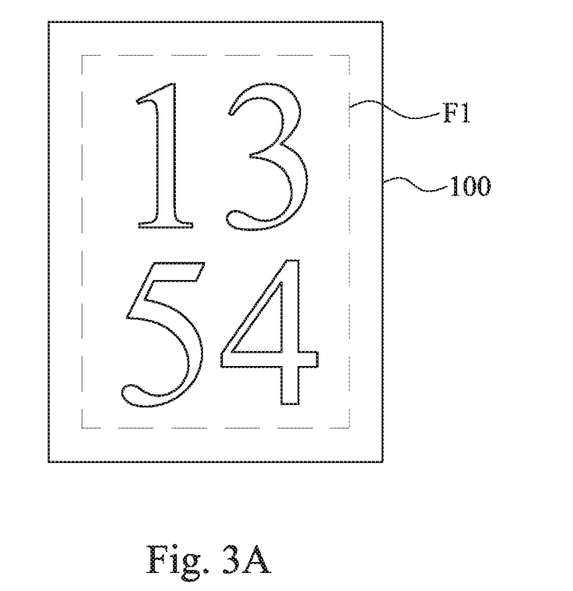
FIG. 3A is a schematic diagram illustrating the displayed screen of the touch display device according to an embodiment of this disclosure.

As shown in FIG. 2A, the touch correction method 200 firstly executes step S210 to detect a first touch signal by the touch detecting circuit 111. Reference is made to FIG. 3A, which is a schematic diagram illustrating the displayed screen of the touch display device 100 according to an embodiment of this disclosure. As shown in FIG. 3A, the display circuit 113 of the touch display device 100 is configured to display the displayed screen F1. Afterwards, reference is made to FIG. 3B, which is a schematic diagram illustrating the screen flicker according to an embodiment of this disclosure. According to the calculation formula of the capacitance, it can be realized that the capacitance is inversely proportional to the distance between the conductive materials. When the touch display device 100 is impacted or dropped to the ground, the distance between the conductive materials in the touch display device 100 will be changed, so that the capacitance will be changed.

Figure 3B:
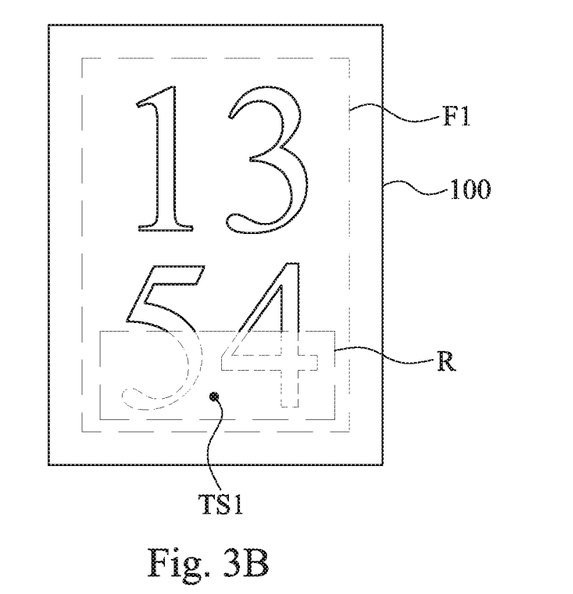
FIG. 3B is a schematic diagram illustrating the screen flicker according to an embodiment of this disclosure.

In the embodiment shown in FIG. 3B, when the touch display device 100 is impacted or dropped to the ground, the screen flicker may be happened. The area R can be realized as the screen flicker area is generated after impacting or dropping. In this region, since the distance between the conductive materials becomes shorter, the capacitance may increase, so the touch detecting circuit 111 may incorrectly determine the touch point. However, the distance between the conductive materials needs a period of time for repairing. The touch detecting circuit 111 continuously detects the capacitance increasing of any touch point in the area R to determine that a touch signal TS1 is received and the situation of screen flicker is happened. In the embodiment, the first touch signal can be realized as the touch signal TS1.

Afterwards, the touch correction method 200 executes step S220 to determine whether a capacitance of the first touch signal is larger than or equal to a first capacitance threshold by the processor 112. In the embodiment, the first capacitance threshold can be set that 0.2 times of finger's touch signal detected by the touch detecting circuit 111, and the processor 112 can determine whether the difference between capacitance of the touch signal TS1 and the baseline is larger than the first capacitance threshold. The processor 112 is configured to calculate a moving average count of a raw count in a frame period to generate the baseline according to the raw count detected by the touch detecting circuit 111.

Afterwards, in another embodiment, the first capacitance threshold can be set that 0.2 times of finger's touch signal detected by the touch detecting circuit 111 and subjoin the baseline, and the processor 112 can determine whether the capacitance of the touch signal TS1 is larger than the first capacitance threshold. The processor 112 is configured to calculate a moving average count of a raw count in a frame period to generate the baseline according to the raw count detected by the touch detecting circuit 111. However, for the setting of the capacitor threshold, the disclosure is not limited thereto.

Afterwards, if the capacitance of the first touch signal is larger than or equal to the first capacitance threshold, the touch correction method 200 executes step S230 to record the time point of the first touch signal, and calculate a first touch position corresponding to the first touch signal by the processor 112. Based on aforesaid embodiment, the processor 112 is configured to calculate a touch position corresponding to the touch signal TS1. Compared to the touch point generated by a finger or stylus, the touch points generated by an impact or a fall do not fixed at a certain position, and the touch positions will be change by the calculated capacitance.

Figure 3C:
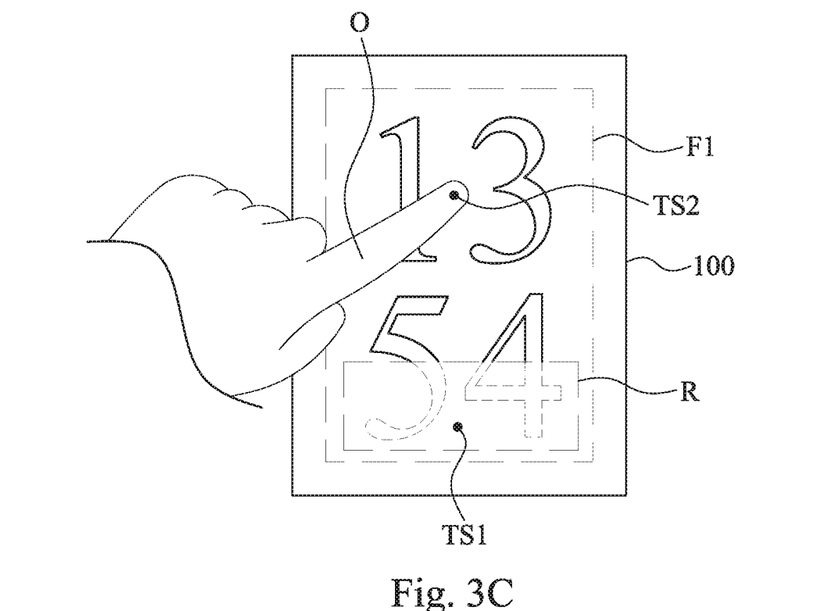
FIG. 3C is a schematic diagram illustrating the touch signal TS2 according to an embodiment of this disclosure.

Afterwards, the touch correction method 200 executes step S240 to detect a second touch signal by the touch detecting circuit 111. Reference is made to FIG. 3C, which is a schematic diagram illustrating the touch signal TS2 according to an embodiment of this disclosure. As shown in FIG. 3C, the touch detecting circuit 111 is configured to detect the touch signal TS2 of the object O. In the embodiment, the second touch signal can be realized as the touch signal TS2.

Afterwards, the touch correction method 200 executes step S241 to determine whether a capacitance of the second touch signal is larger than or equal to the first capacitance threshold by the processor 112, and step S242 to record the time point of the second touch signal by the processor 112.

Afterwards, the touch correction method 200 executes step S243 to calculate a time difference between the time point of the first touch signal and the time point of the second touch signal, and determine whether the time difference is larger than or equal to a threshold. In the embodiment, the threshold can be set to the any value between 0.5 and 5 seconds. In another embodiment, the threshold can be set to the any value between 2 and 5 seconds.

Afterwards, if the time difference is larger than or equal to a threshold, the touch correction method 200 executes step S244 to adjust the first touch signal and the second touch signal according to the baseline by processor 112. In the embodiment, the processor 112 is configured to calculate the moving average count of the raw count in a frame period to generate the baseline according to the raw count detected by the touch detecting circuit 111. In this case, the frame period can be set as 8-10 frames. The baseline corresponding to each touch position can be calculated. If the time difference is larger than or equal to a threshold, the processor 112 is configured to change the capacitance of the touch signal TS1 and the capacitance of the touch signal TS2 according to the baseline corresponding of the touch signal TS1 and the touch signal TS2, respectively.

Afterwards, when the operation of the step S210-S244 are performed, the situation of screen flicker can be fixed out. It is noticed that the processor 112 modifies the capacitance of the touch point corresponding to the touch signal TS1 and the capacitance of the touch point corresponding to the touch signal TS2 to the baseline corresponding of the touch signal TS1 and the touch signal TS2, respectively. That is, the touch detecting circuit 111 does not detect the capacitance exceeding the first capacitance threshold at the touch point corresponding to the touch signal TS1. The situation of screen flicker will not happen in the area R. The display circuit 113 returns to the display state as shown in FIG. 3A.

Figure 4A:
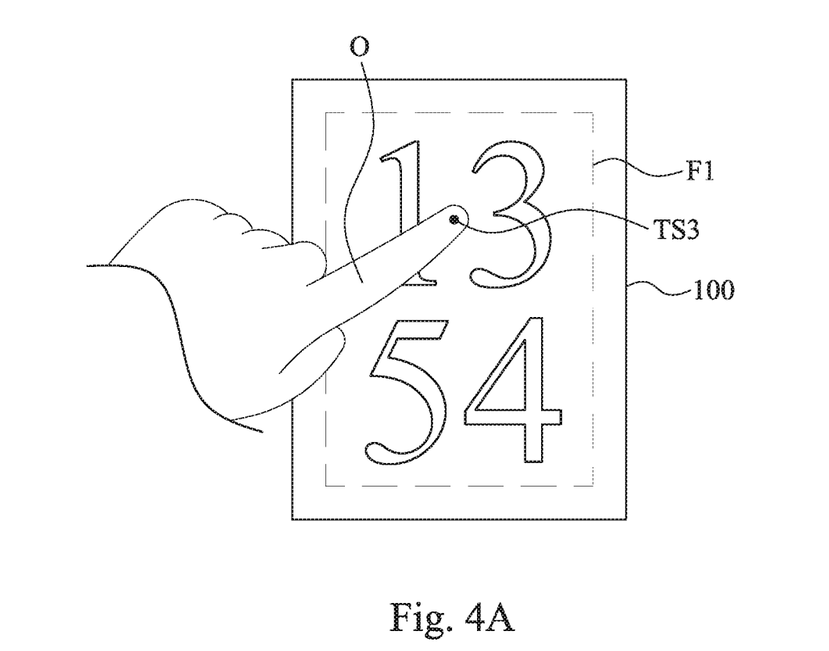
FIG. 4A is a schematic diagram illustrating the touch signal TS3 according to an embodiment of this disclosure.

In another embodiment, reference is made to FIG. 4A, which is a schematic diagram illustrating the touch signal TS3 according to an embodiment of this disclosure. As shown in FIG. 4A, the touch detecting circuit 111 is configured to detect the touch signal TS3 of the object O. In the embodiment, the first touch signal can be realized as the touch signal TS3. In the step S230, if the capacitance of the first touch signal is larger than the first capacitance threshold, it is represented that the object O touches the touch detecting circuit 111 in the step S220. Afterwards, the processor 112 is configured to calculate a first touch position corresponding to the first touch signal. Based on aforesaid embodiment, the processor 112 is configured to calculate the touch position corresponding to the touch signal TS3, and it means that the touch position of object O.

Figure 4B:
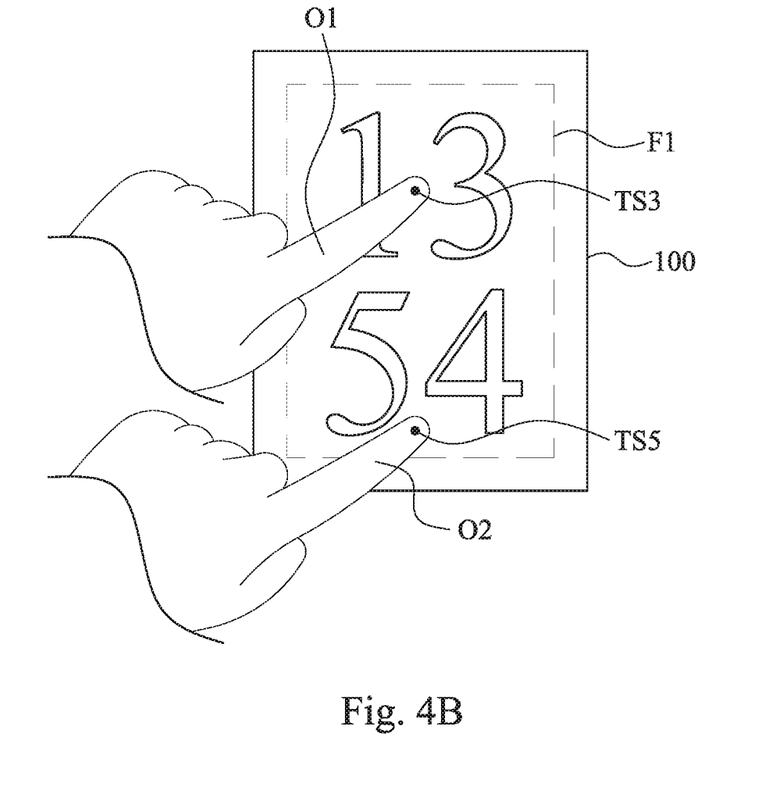
FIG. 4B is a schematic diagram illustrating the touch signals TS4 and TS5 according to an embodiment of this disclosure.

In another embodiment, reference is made to FIG. 4B, which is a schematic diagram illustrating the touch signals TS4 and TS5 according to an embodiment of this disclosure. As shown in FIG. 4B, the touch detecting circuit 111 is configured to detect the touch signal TS4 and TS5 of the object O1 and O2. In the embodiment, the first touch signal can be realized as the touch signal TS4, and the second touch signal can be realized as the touch signal TS5. In the step S243, the processor 112 is configured to determine whether the time difference between the time point of the first touch signal and the time point of the second touch signal is less than the threshold, and it is represented that the object O1 and O2 touch the touch detecting circuit 111 in the step S220 and step S241, respectively.

Afterwards, the touch correction method 200 executes step S245 to calculate a first touch position corresponding to the first touch signal and a second touch position corresponding to the second touch signal by the processor 112. In the embodiment, if the time difference is less than the threshold, the processor 112 is configured to calculate the touch positions corresponding to the touch signals TS4 and TS5, respectively. It is means that the touch positions of the objects O1 and O2.

In another embodiment, in the step S220, when the capacitance of the first touch signal is less than the first capacitance threshold, the touch correction method 200 executes step S250 to determine whether the capacitance of the first touch signal is less than the first capacitance threshold and larger than a second capacitance threshold by the processor 112. In the embodiment, the first capacitance threshold can be set that 0.2 times of finger's touch signal detected by the touch detecting circuit 111, and the second capacitance threshold can be set that a negative value of 0.2 times of finger's touch signal detected by the touch detecting circuit 111.

Afterwards, in the step S241, when the processor 112 is configured to determine the capacitance of the second touch signal is less than first capacitance threshold, the touch correction method 200 further executes step S250. The operation method of step S250 has been described as aforesaid, and for the sake of brevity, those descriptions will not be repeated here.

Afterwards, if the capacitance of the first touch signal is less than the first capacitance threshold and larger than a second capacitance threshold, the touch correction method 200 further executes step S251 to update the baseline by processor 112. In the embodiment, it can be realized that the touch signal of the finger or stylus is less than the first capacitance threshold, and then the processor 112 is configured to update the baseline. It is utilized the calculation method of the moving average count to update the baseline, and the baseline will not updated when a touch point is generated.

Afterwards, in the step S250, the processor 112 is configured to determine whether the capacitance of the first touch signal is less than the first capacitance threshold and larger than the second capacitance threshold, if the capacitance of the first touch signal does not meet the above conditions, and the touch correction method 200 further executes step S252 to adjust the first touch signal according to the baseline. In the embodiment, if the capacitance of the first touch signal does not meet the determination condition of step S250, it is represented that the capacitance of the first touch signal is less than the second capacitance threshold. In this case, the processor 112 is configured to modify the capacitance of the touch signal TS1 according to the baseline corresponding to the touch signal TS1.

Afterwards, when the touch display device is impacted or dropped to the ground the distance between the conductive materials becomes longer, the capacitance may decrease and causes abnormal capacitance. Thus, the processor 112 determines an abnormal condition is happened. Therefore, when the touch detecting circuit 111 detects the capacitance of the touch signal less than the second capacitance threshold, the processor 112 is configured to modify the capacitance of the touch signal TS1 according to the baseline corresponding to the touch signal TS1 and fix out the abnormal condition.

In another embodiment, when the first touch signal is received in the step S210, the processor 112 is configured to determine whether the capacitance of the first touch signal is less than the second capacitance threshold, if the capacitance of the first touch signal is less than the second capacitance threshold, the processor 112 is configured to adjust the first touch signal according to the baseline.

In another embodiment, when the touch correction method 200 is performed the step S243, the processor 112 further determine whether the capacitance of the second touch signal is less than the first capacitance threshold. As shown in FIG. 3C, the object O touches the touch detecting circuit 111 in the step S241, and then the processor 112 determines the capacitance of the second touch signal is less than the first capacitance threshold. It is represented that the touch point is released by the object O. Thus, the touch detecting circuit 111 detects the touch signal TS2 less than the first capacitance threshold, and then the touch correction method 200 is further performed the operation of the step S244.

In another embodiment, when the touch correction method 200 is performed the step S243, the processor 112 further calculate a first touch position corresponding to the first touch signal and a second touch position corresponding to the second touch signal. As shown in FIG. 3B and FIG. 3C, the processor is configured to calculate the touch position of the object O and the position of the touch signal TS1 generated by impacting. Then, the touch correction method 200 performs the operation of the step S254.

In another embodiment, when the touch correction method 200 is performed the step S253, the processor 112 further calculate the first touch position corresponding to the first touch signal and the second touch position corresponding to the second touch signal. Then, the processor 112 further determines whether the capacitance of the second touch signal is less than the first capacitance threshold, and then the touch correction method 200 performs the operation of the step S254. For the sake of brevity, those descriptions will not be repeated here.

Figure 5:
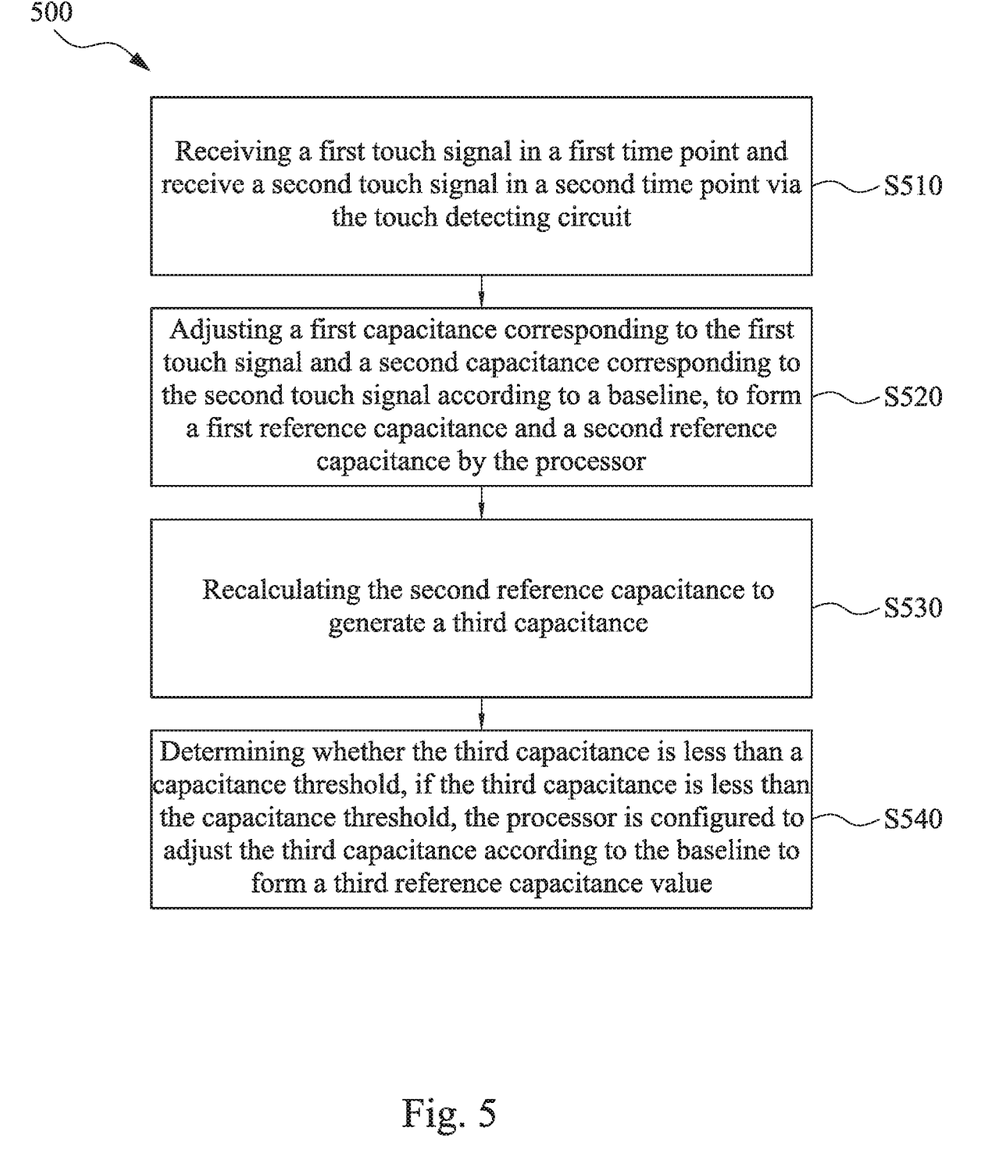
FIG. 5 is a flow diagram of a touch correction method for touch display device according to one embodiment of the present disclosure.

In another embodiment, reference is made to FIG. 5, which is a flow diagram of a touch correction method 500 for touch display device 100 according to one embodiment of the present disclosure. In the embodiment, the processor 110 can be utilized to correct the situation of false touch points or abnormal capacitance caused by impacted or dropped to the ground according to the steps described in the following touch correction method 500.

As shown in FIG. 5, the touch correction method 200 firstly executes step S510 to receive a first touch signal in a first time point and receive a second touch signal in a second time point via the touch detecting circuit 111. In the embodiment, the second time point is later than the first time point.

Afterwards, when the touch detecting circuit 111 detects that the second touch signal is released, the touch correction method 200 executes step S520 to adjust a first capacitance corresponding to the first touch signal and a second capacitance corresponding to the second touch signal according to a baseline, to form a first reference capacitance and a second reference capacitance by the processor 112. In this case, the capacitance corresponding to the second touch signal detected by the touch detecting circuit 111 less than the threshold, and the processor 112 further calculates the time difference between the second time point and the first time point. When the time difference is larger than the threshold, the processor 112 is configured to adjust the first capacitance corresponding to the first touch signal and the second capacitance corresponding to the second touch signal according to the baseline. Thus, the first capacitance is changed to the first reference capacitance, and the second capacitance is changed to the second reference capacitance.

Afterwards, when the touch detecting circuit detects that the first touch signal is released, the touch correction method 200 further executes step S530 to recalculate the second reference capacitance to generate a third capacitance. In this case, the capacitance corresponding to the first touch signal detected by the touch detecting circuit 111 less than the threshold, and the processor 112 further recalculates the third capacitance according to the second reference capacitance. It is noticed that the touch signal is connected in parallel with the touch sensor in the touch detection circuit 111, so that the capacitance is increased. In contrast, when the touch signal is released, the touch signal connected in parallel with the touch sensor is disappeared, so that the capacitance will be decreased.

Afterwards, the touch correction method 200 further executes step S540 to determine whether the third capacitance is less than a capacitance threshold, if the third capacitance is less than the capacitance threshold, the processor is configured to adjust the third capacitance according to the baseline to form a third reference capacitance value. The capacitance threshold can be set that a negative value of 0.2 times of finger's touch signal detected by the touch detecting circuit 111. Based on aforesaid embodiment, when the first touch signal is released, it will be caused that the capacitance of the touch position corresponding to the first touch signal becomes the negative value, so that the capacitance of the touch position is less than the capacitance threshold. Thus, the processor 112 is configured to adjust the third capacitance according to the baseline to generate the third reference capacitance value.

Afterwards, the first capacitance is larger than the first reference capacitance. The second capacitance is larger than the second reference capacitance. The third capacitance is less than the second reference capacitance, and the third capacitance is less than the third reference capacitance. In the aforesaid operation, the adjusting the capacitance operation according to the baseline has been executed two times by the processor 112. The calculation of the baseline has been described as aforesaid, and for the sake of brevity, those descriptions will not be repeated here.

Based on aforesaid embodiments, this disclosure is capable of utilizing the time difference of the touch signals or the capacitance generated by the touch signal to correct the touch signal, and utilizing the baseline to adjust abnormal capacitance to fix out the situation of the misjudgment of touch point or abnormal capacitance, when the touch display device is impacted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A touch display device, comprising:
a touch detecting circuit is configured to detect a first touch signal and a second touch signal; and
a processor, electrically connected to the touch detecting circuit, is configured to record a first time point when the first touch signal is received, and record a second time point when the second touch signal is received; wherein the processor is configured to calculate a time difference between the first time point and the second time point, if the time difference is larger than or equal to a threshold, the processor is configured to modify a capacitance of the first touch signal and a capacitance of the second touch signal to a baseline.

2. The touch display device of claim 1, wherein the processor is further configured to determine whether the capacitance of the first touch signal is larger than or equal to a first capacitance threshold, if the capacitance of the first touch signal is larger than or equal to the first capacitance threshold, the processor is configured to record the first time point of the first touch signal, and calculate a first touch position corresponding to the first touch signal; if the capacitance of the first touch signal is less than the first capacitance threshold and larger than a second capacitance threshold, the processor is configured to update the baseline.

3. The touch display device of claim 2, wherein after recording the first touch signal, the processor is further configured to determine whether the capacitance of the second touch signal is larger than or equal to the first capacitance threshold, if the capacitance of the first touch signal is larger than or equal to the first capacitance threshold, the processor is configured to record the second time point of the second touch signal; if the capacitance of the second touch signal is less than the first capacitance threshold and larger than the second capacitance threshold, the processor is configured to update the baseline.

4. The touch display device of claim 3, wherein if the time difference is less than the threshold, the processor is configured to calculate the first touch position corresponding to the first touch signal and a second touch position corresponding to the second touch signal.

5. The touch display device of claim 1, wherein when the time difference is larger than or equal to the threshold, the processor is further configured to determine whether the capacitance of the second touch signal is less than a first capacitance threshold, if the capacitance of the second touch signal is less than the first capacitance threshold, the processor is further configured to adjust the first touch signal and the second touch signal according to the baseline.

6. The touch display device of claim 1, wherein when the time difference is larger than or equal to the threshold, the processor is configured to calculate a first touch position corresponding to the first touch signal and a second touch position corresponding to the second touch signal, and adjust the first touch signal and the second touch signal according to the baseline.

7. The touch display device of claim 1, wherein when the time difference is larger than or equal to the threshold, the processor is configured to calculate a first touch position corresponding to the first touch signal and a second touch position corresponding to the second touch signal, and then the processor is further configured to determine whether the capacitance of the second touch signal is less than a first capacitance threshold, if the capacitance of the second touch signal is less than the first capacitance threshold, the processor is configured to adjust the first touch signal and the second touch signal according to the baseline.

8. The touch display device of claim 1, wherein the threshold is set to any value between 0.5 seconds and 5 seconds.

9. The touch display device of claim 1, wherein the processor is configured to calculate a moving average count of a raw count in a frame period to generate the baseline according to the raw count detected by the touch detecting circuit.

10. A touch display device, comprising:
a touch detecting circuit; and
a processor, electrically connected to the touch detecting circuit, is configured to receive a first touch signal in a first time point and receive a second touch signal in a second time point via the touch detecting circuit, wherein the second time point is later than the first time point;
when the touch detecting circuit detects that the second touch signal is released, the processor is configured to modify a first capacitance corresponding to the first touch signal and a second capacitance corresponding to the second touch signal to a baseline, to form a first reference capacitance and a second reference capacitance.

11. The touch display device of claim 10, wherein when the touch detecting circuit detects that the first touch signal is released, the processor is configured to recalculate the second reference capacitance to generate a third capacitance, and determine whether the third capacitance is less than a capacitance threshold, if the third capacitance is less than the capacitance threshold, the processor is configured to adjust the third capacitance according to the baseline to form a third reference capacitance.

12. The touch display device of claim 11, wherein the first capacitance is larger than the first reference capacitance; the second capacitance is larger than the second reference capacitance; the third capacitance is less than the second reference capacitance, and the third capacitance is less than the third reference capacitance.

13. The touch display device of claim 10, wherein a difference between the first time point and the second time point is larger than a threshold.

14. The touch display device of claim 10, wherein the processor is configured to calculate a moving average count of a raw count in a frame period to generate the baseline according to the raw count detected by the touch detecting circuit.

* * * * *